Nov. 25, 1941.　　L. T. DALECKE ET AL　　2,263,981
SAFETY GUARD FOR INDUSTRIAL TRUCKS
Filed Nov. 25, 1940
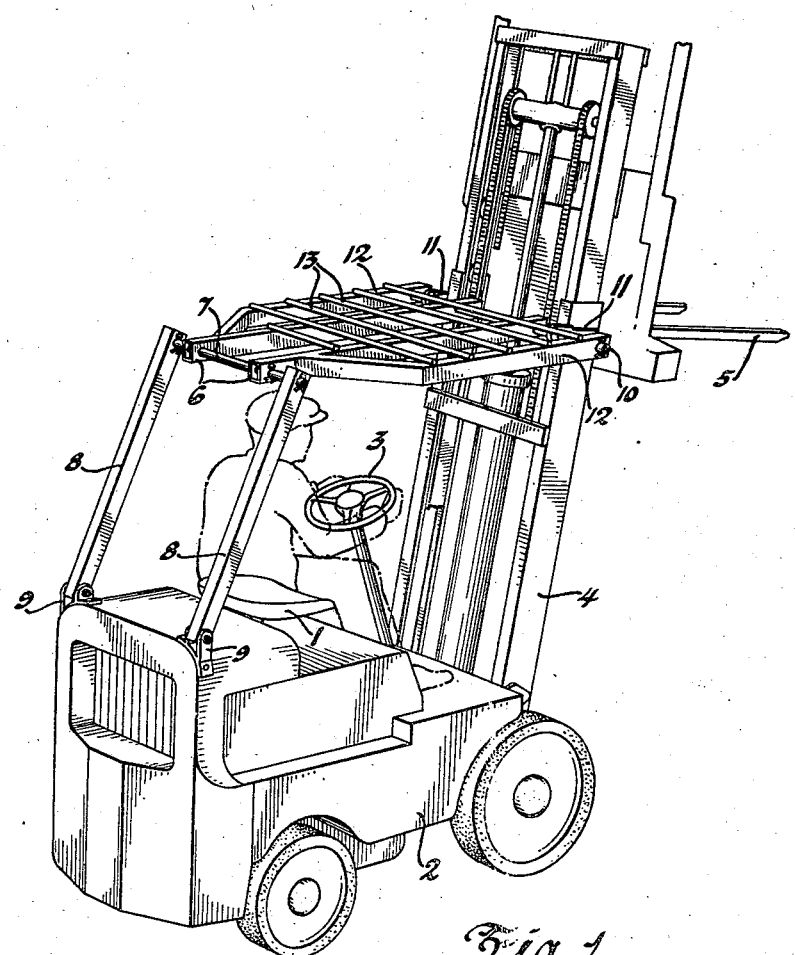
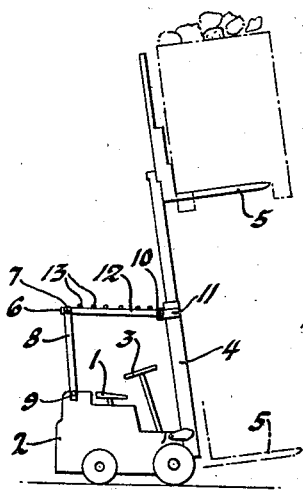
Inventors
Leonard T. Dalecke &
Albert W. Haase
By
Blackmore, Spencer & Flint
Attorneys Patented Nov. 25, 1941

2,263,981

UNITED STATES PATENT OFFICE 2,263,981

SAFETY GUARD FOR INDUSTRIAL TRUCKS

Leonard T. Dalecke and Albert W. Haase, Janesville, Wis., assignors to General Motors Corporation, Detroit, Mich., a corporation of Delaware Application November 25, 1940, Serial No. 367,036

5 Claims. (Cl. 214—113)

This invention relates to an improved overhead protection guard for an industrial lift truck.

It is an object of the invention to provide a simplified structure which can be manufactured and applied at low cost to the conventional type of stacking truck and which will follow the movement of the tiltable tower to afford protection to the operator in all positions of the tower by fending off the fall of materials or containers from overhead.

Additional objects and advantages will become apparent upon inspection of the accompanying drawing wherein Figure 1 is a perspective view of a lift truck embodying the invention and Figure 2 is a more or less diagrammatic side elevation of the truck on a small scale.

The drawing shows the type of truck in common use for hauling and stacking materials in industrial plants. It may be driven by an internal combustion engine under control of an operator. The operator control station includes a forwardly facing seat pan 1 on top of the truck 2 together with the necessary controls including the steering wheel 3. Pivoted to the front of the truck 2 ahead of the operator and on a horizontal transversely extending axis is a swingable upright lift tower assembly 4 which includes the vertically adjustable elevator 5. In use the elevator 5 can be adjusted to various vertical positions under control of the operator and by the tilting adjustment of the tower can be inclined downwardly or upwardly to facilitate picking up the load and its transportation. Usually the load will be placed on a raised platform or container and in the handling of the material the platform devices may be stacked on top of one another in storage positions. Figure 2 illustrates the raised position of the elevator for stacking purposes.

According to the present invention a safety guard is provided over the operator's station to deflect the falling load should it become dislodged from the elevator accidentally. For simplicity of construction the guard may include a pair of spaced longitudinal rails 6—6 which at the rear are provided with openings through which projects a transverse axle or pipe 7 having its opposite ends pivoted in openings in a pair of swinging standards or posts 8 projecting upwardly from the truck behind the operator's station and being hingedly mounted at their lower ends on the truck through the supporting brackets 9. The forward ends of the guard bars 6—6 similarly are provided with openings to receive a transverse axle or pipe 10 which is pivotally supported in a pair of spaced brackets 11 welded or otherwise secured to the upper ends of the guide rails of the swinging tower assembly 4. Supplementing the bars 6—6 are a pair of side rails 12 each having its forward end fitted to the adjacent end of the axle 10 with its rearward end bent inwardly and welded or otherwise secured to the neighboring bar 6 adjacent the supporting shaft 7. To complete the fender a series of spaced transversely extending tubes or rods 13 are laid on top and welded to the bars 6 and 12.

By reason of the construction described the guard assembly bridges the operator's station and by reason of its pivotal connection with the tower assembly and its pivotal support on the rearward hinged uprights 8—8 is able to follow the swinging movement of the tower so as to afford complete protection to the operator in all relative positions of the parts. The structure described is free of complicated mechanisms and can be easily built up from readily available parts without special equipment. While only one embodiment has been described it is to be understood that the invention is capable of various modifications such as come within the scope of the appended claims.

We claim:

1. In combination with a lift truck having a tiltable tower for a vertically adjustable elevator, of a horizontally shiftable overhead guard projecting rearwardly from the top of the tower and bridging the operator station, means pivotally supporting on the upper portions of the tower the end of the guard adjacent the tower and a swinging support hingedly mounted on the truck and pivotally connected with the other end of said guard.

2. In combination, a lift truck having an upright tiltable tower supporting a vertically adjustable and longitudinally extending elevator and being located beyond one end of the operator station, an upright tiltable standard beyond the other end of the operator station and an overhead protection rack bridging the operator station and pivotally connected to both the elevator supporting tower and standard.

3. In an operator driven truck, an operator controlled tower pivotally mounted on the truck and provided with an elevator vertically adjustable thereon, an upright support also pivotally mounted on the truck but spaced from the tower and an overhead protection guard bridging said space and pivotally connected to both the tower and said upright support.

4. In an operator driven truck, a swinging lift tower for a vertically adjustable elevator, a swinging upright spaced from the tower and arranged to follow swinging tower movement, an operator station between the tower and the upright and a protection guard positioned above the operator station and supported by the upright and said tower.

5. For use with a truck having a tiltable lift tower, a protection fender and means supporting the same in protective relation to the operator in all positions of the tower including a pivot connection between the upper portion of the tower and the forward end of the fender, an upright swinging link having pivotal connection at its upper end with the rearward end of the fender and means pivotally supporting the lower end of the link on the truck.

LEONARD T. DALECKE.
ALBERT W. HAASE.